United States Patent [19]
Hosch et al.

[11] Patent Number: 6,109,427
[45] Date of Patent: Aug. 29, 2000

[54] CONVEYOR CONSTRUCTION

[75] Inventors: Michael A. Hosch, Oconomowoc; Scott M. Hall, Franklin; Daniel E. Ertel, Oconomowoc; Kenneth A. Hansen, Waukesha, all of Wis.

[73] Assignee: Dorner Mfg. Corp., Hartland, Wis.

[21] Appl. No.: 09/008,720

[22] Filed: Jan. 19, 1998

[51] Int. Cl.[7] ................................................. B65G 23/04
[52] U.S. Cl. .......................... 198/835; 198/837; 198/844.1
[58] Field of Search .................................... 198/835, 837, 198/840, 841, 842, 844.1, 845

[56] References Cited

U.S. PATENT DOCUMENTS

| | | |
|---|---|---|
| 1,347,121 | 7/1920 | Rice . |
| 4,015,484 | 4/1977 | Taylor ................................. 198/840 X |
| 4,601,685 | 7/1986 | Delhaes ............................... 198/840 X |
| 5,017,969 | 5/1991 | Mitomi et al. ...................... 198/835 X |
| 5,096,045 | 3/1992 | Feldl ................................... 198/835 X |
| 5,156,260 | 10/1992 | Dorner et al. . |
| 5,156,261 | 10/1992 | Dorner . |
| 5,174,435 | 12/1992 | Dorner et al. . |
| 5,507,382 | 4/1996 | Hartwell et al. .................... 198/835 X |
| 5,609,238 | 3/1997 | Christensen . |

Primary Examiner—Christopher P. Ellis
Assistant Examiner—Gene O. Crawford
Attorney, Agent, or Firm—Andrus, Sceales, Starke & Sawall

[57] ABSTRACT

A conveyor construction includes a frame, a drive section stationarily mounted to the frame, and a tensioning section mounted for longitudinal movement relative to the frame. The drive and tensioning sections each include a spindle, and a belt is engaged with the spindles. The frame defines an upper support surface disposed below the upper run of the belt, and mating engagement structure is provided on the belt and the upper support surface for preventing lateral movement of the belt relative to the upper support surface. The drive and tensioning sections include spaced side members, each of which defines an inwardly opening cavity for receiving a bearing assembly for rotatably supporting the spindle. The bearing-receiving cavity faces the spindle, and each side member defines outer wall structure which engages and supports the belt outwardly of the spindle. The belt overlies the outer wall structure of each side member and the adjacent belt-engaging portion of the spindle, so as to seal the inwardly facing opening and prevent ingress of moisture or other contaminants into the bearing-receiving cavity.

13 Claims, 4 Drawing Sheets

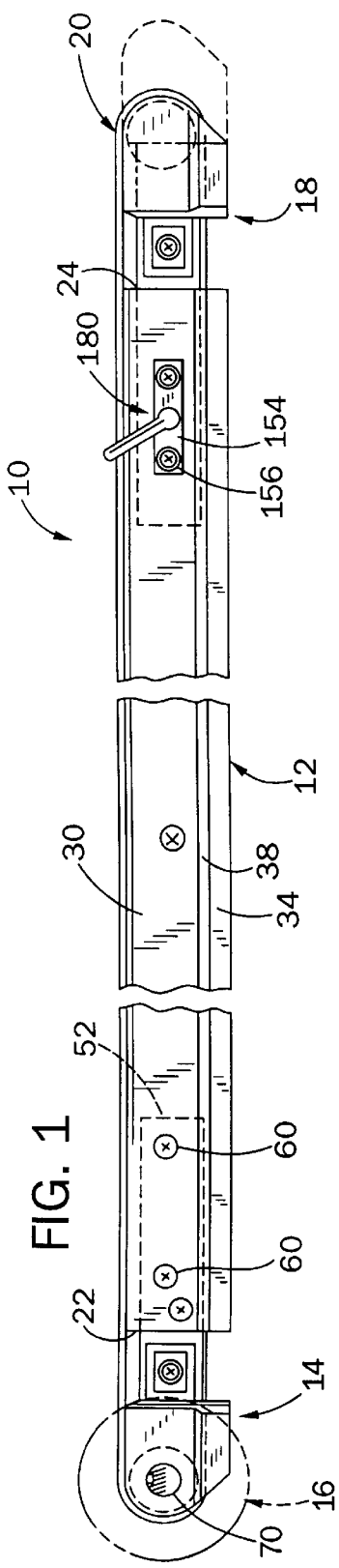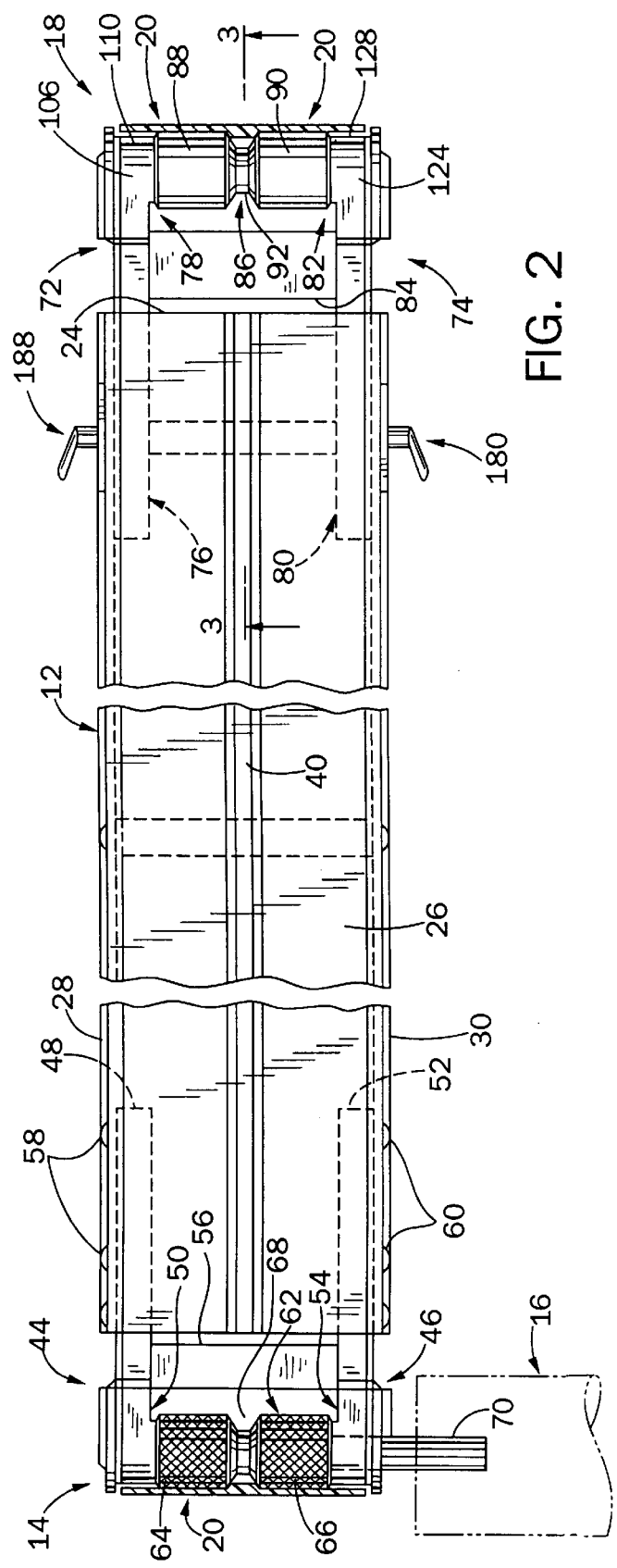

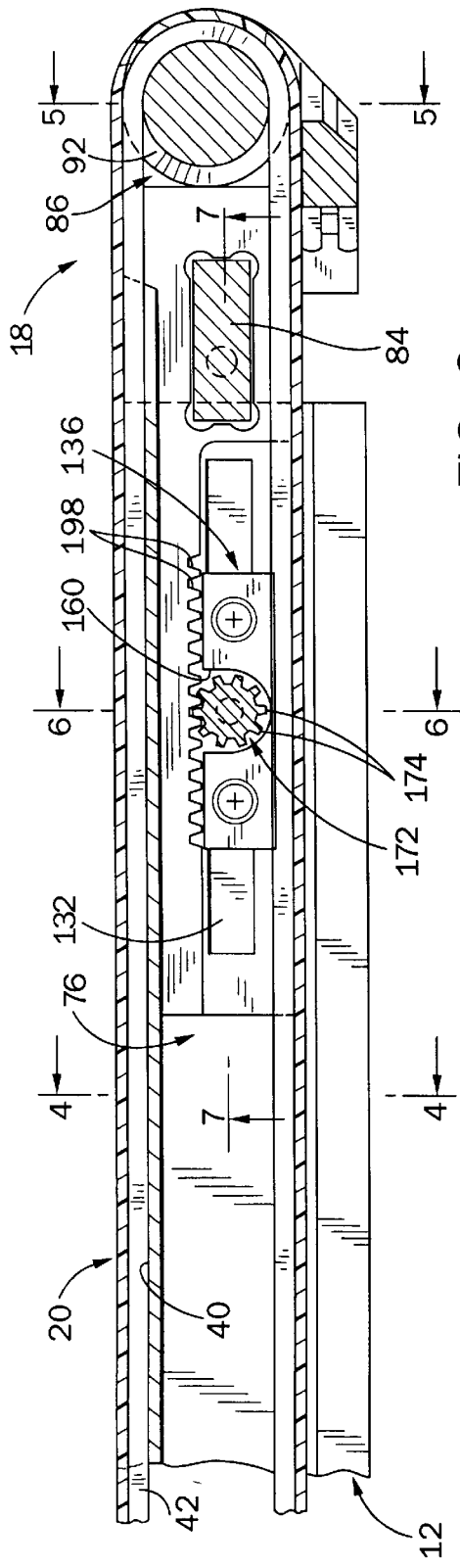
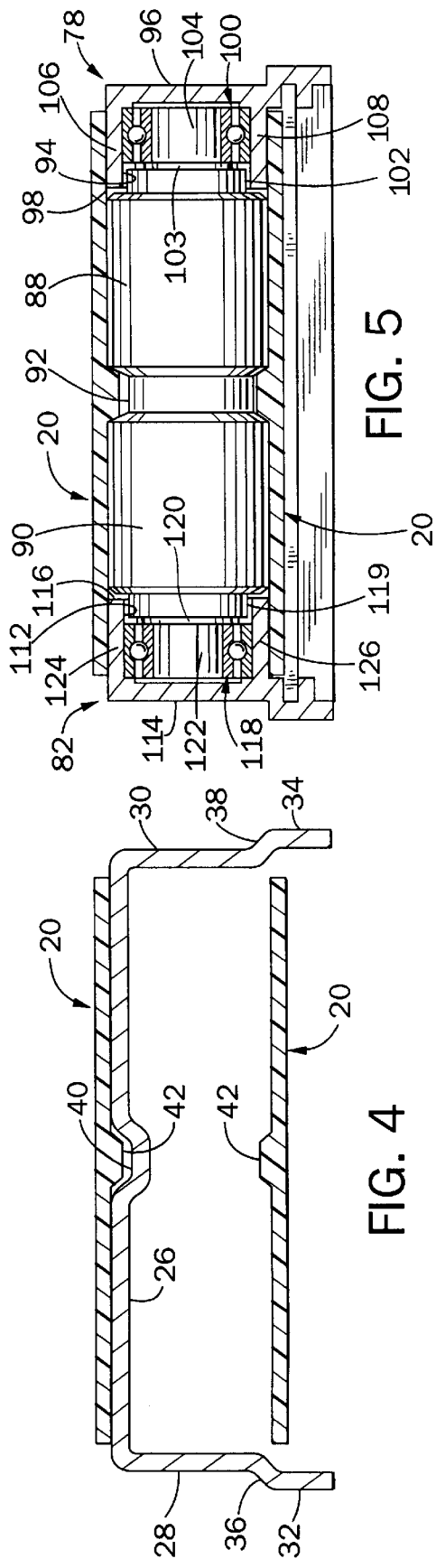
FIG. 3
FIG. 4
FIG. 5

CONVEYOR CONSTRUCTION

BACKGROUND AND SUMMARY OF THE INVENTION

This invention relates to conveyors, and more particularly to a number of features in a conveyor which facilitate manufacture, assembly, operation and maintenance of a conveyor.

The present invention contemplates a number of improvements to a conveyor construction, such as that generally disclosed in Dorner et al U.S. Pat. No. 5,174,435, the disclosure of which is hereby incorporated by reference. The '435 patent generally discloses a conveyor construction including a frame and a tensioning section mounted for movement relative to the frame. The tensioning section includes a spindle about which a conveyor belt is trained, and movement of the tensioning section functions to control the tension of the belt. The tensioning section is extended and retracted in response to rotation of a drive pinion rotatably mounted to the frame. The frame includes a channel or slot on each side, and slide bars are located within each slot for longitudinal movement therewithin. The slide bars are interconnected with the tensioning section via an outer plate and one or more threaded screws which extend through openings formed in the outer plate and into threaded engagement with threaded openings formed in the slide bars. When a desired position of the tensioning mechanism has been attained by rotation of the drive pinion, the screws are tightened so as to clamp the portions of the frame adjacent the slot between the outer plate and the slide bars. In this arrangement, the tensioning section is locked in position separate from the drive pinion which functions to provide movement of the tensioning section. In addition, the conveyor disclosed in the '435 patent contemplates a spindle which extends the full width of the belt. Cavities are formed in the ends of the spindle, and a bearing assembly is mounted within each cavity. A collar extends into the cavity and into engagement with the bearing assembly. The collar includes an outer end which is mounted to the side plate for rotatably mounting the spindle to and between the side plates. This construction is generally satisfactory, but can present problems in a wash-down application and presents the possibility that water can make its way into the bearing assembly from the outside of the conveyor.

It is an object of the present invention to provide an improved and simplified conveyor construction providing enhancements in the components, assembly, operation and maintenance of the conveyor construction. Another object of the invention is to provide a conveyor construction in which the tensioning section can be locked in position utilizing a single-point locking mechanism Yet another object of the invention is to provide such a locking mechanism which is operable on the drive pinion, which functions to move the tensioning section relative to the frame. A still further object of the invention is to provide a conveyor construction in which the belt is engaged with the frame between the drive spindle and the idler spindle, to prevent skewing of the belt. A still further object of the invention is to provide a conveyor construction providing an improved structure for engaging the drive pinion with the tensioning section. Yet another object of the invention is to provide a conveyor construction which is capable of use in a wash-down environment by preventing ingress of water into the spindle bearing cavity. Yet another object of the invention is to provide a simplified conveyor frame construction facilitating attachment of conveyor accessories to the frame.

In accordance with one aspect of the invention, a conveyor construction includes a frame, a pair of spindles mounted to the frame and a belt trained about the spindles. An upper support member is associated with the frame and located between the spindles. The upper support member is disposed below the belt, so as to support the belt between the spindles. Mating engagement structure is interposed between the belt, the spindles and the upper support member for preventing lateral movement of the belt relative to the spindles and relative to the frame between the spindles. In this manner, the belt is maintained in a tracked relationship relative to the spindles and to the frame, to prevent skewing of the belt or other lateral movement of the belt. Preferably, the engagement structure is in the form of a rib extending from the underside of the belt, which is received within a longitudinal groove formed in the upper support member within which the rib is received when the belt is engaged with the upper support member. Each spindle includes a groove in alignment with the groove in the upper support member for receiving the rib. The upper support member defines a first end and a second end, and the groove preferably extends the full length of the upper support member between its first and second ends.

In accordance with another aspect of the invention, a conveyor construction includes a frame having a pair of side members, in combination with a belt and a belt tensioning mechanism movably mounted to the frame and including a spindle engageable with the belt. A pair of side members are located one adjacent each frame side member, and a drive member is rotatably mounted to the frame. This aspect of the invention contemplates an improvement in the form of engagement structure provided on both of the side plate members. The drive member is engaged with the engagement structure so as to effect movement of the belt tensioning mechanism relative to the frame upon rotation of the drive member. The drive member is preferably in the form of a rotatable drive pinion having a series of outwardly extending gear teeth, and the side plate member engagement structure is preferably in the form of a series of gear teeth provided on the side plate member and engageable with the drive pinion gear teeth. The side plate member gear teeth cooperate to define an axially extending gear rack which extends along an axis substantially parallel to the direction of movement of the belt tensioning mechanism relative to the frame. Each side plate member preferably includes an axially extending slot located adjacent the gear rack defined by the series of spaced gear teeth. The drive pinion is mounted to the frame side member via a pinion mounting member or carrier, which extends through the side plate member slot and which is interconnected with the frame side member. The pinion mounting member or carrier includes an inner pinion mounting section for rotatably supporting the pinion, and an outer frame connection section extending from the pinion mounting section and disposed within the side plate member slot and engaged with the frame side member. The side plate member gear teeth are preferably formed integrally with the side plate member. This arrangement provides positive engagement of the side plate members with the drive pinion to ensure that the side plate members are simultaneously and synchronously advanced and retracted upon rotation of the drive pinion, to maintain constant tension on the belt throughout the width of the belt.

Another aspect of the invention contemplates a spindle mounting arrangement for a conveyor construction including a belt and at least one spindle about which the belt is trained. The spindle mounting arrangement includes a spindle mounting member having a cavity defined at least in part by an upper wall and a side wall. The cavity includes an inwardly facing opening, and a bearing arrangement is disposed within the cavity for rotatably mounting the spindle to the spindle mounting member. The cavity opening faces the spindle, and the mounting member upper wall and side wall are configured so as to enclose the cavity from the exterior of the mounting member. The spindle includes a belt engaging surface, and the upper wall and side wall of the spindle mounting member terminate in an inner edge at least in part defining the opening. The inner edge is located adjacent the belt engaging surface of the spindle, and the belt is in engagement with the belt engaging surface and overlies the upper wall, the side wall and the inner edge. This arrangement defines a space between the inner edge and the belt engaging surface, and the belt overlies the space. The belt thus seals the space between the belt engaging surface of the spindle and the inner edge defined by the mounting member side wall and end wall, so as to prevent ingress of water into the space and thus prevent water from coming into contact with the bearing arrangement. The spindle preferably includes a shaft extending outwardly from a portion of the spindle defining a belt engaging surface, and the shaft defines an axis of rotation about which the spindle is rotatable. The spindle shaft is engaged with the bearing arrangement to facilitate rotation of the spindle relative to the spindle mounting member.

Yet another aspect of the invention contemplates an improvement in a conveyor construction in which a drive member is rotatably mounted to the frame and drivingly engaged with the tensioning section of a conveyor for imparting longitudinal movement of the tensioning section relative to the frame upon rotation of the drive member. The improvement is in the form of a locking member interconnected with the drive member for selectively preventing rotation of the drive member so as to selectively fix the position of the tensioning section relative to the frame. The locking member functions to frictionally engage the drive member with the frame for selectively preventing rotation of the drive member. The locking member is preferably in the form of a threaded member in threaded engagement with the drive member and including a head located adjacent the frame. An engagement surface is associated with the frame and is located adjacent an engagement surface defined by the drive member. Rotation of the threaded locking member functions to engage the head with the frame to thereby draw the drive member engagement surface into frictional engagement with the frame engagement surface to prevent rotation of the drive member. The drive member preferably defines a pair of spaced ends, and the locking member is engaged with a first one of the spaced ends. A drive actuator is interconnected with a second one of the spaced ends of the drive member, for selectively imparting rotation to the drive member. The drive actuator preferably includes an actuator member drivingly engaged with the drive member and a manually operable handle engaged with the actuator member. The actuator handle is located adjacent a first side defined by the frame. The locking member includes a threaded member threadedly engaged with the drive member and a manually operable locking handle located adjacent a second side defined by the frame opposite the first side. In a preferred form, each end of the drive member is rotatably supported by a drive member carrier fixed to the frame, as summarized previously.

A still further aspect of the invention contemplates an improvement to a conveyor construction as summarized above, in the form of a rotation or actuator arrangement interconnected with the drive member for imparting rotation to the drive member, and a locking device separate from the rotation arrangement and operable on the drive member for selectively locking the drive member against rotation to thereby fix the longitudinal position of the tensioning section relative to the frame. The rotation arrangement includes an axially extending drive member actuator which extends along the axis of rotation of the drive member, and the locking device includes a threaded locking member threadedly engaged with the drive member. The locking member extends along a longitudinal axis coincident with that of the drive member actuator. The drive member preferably defines a pair of spaced ends, and the drive member actuator is engaged with one end of the drive member and the threaded locking member is engaged with the other end of the drive member. A handle is preferably interconnected with the drive member actuator and is located adjacent one side of the frame, and a locking handle is located adjacent an opposite side of the frame for selectively imparting rotation to the locking member. The drive member is preferably mounted to the frame via a pair of spaced carrier members, as summarized previously.

A still further object of the invention contemplates an accessory mounting arrangement for a conveyor including a frame having at least one side wall defining a lower edge, and at least one spindle mounted to the frame and a belt engaged with the spindle. The accessory mounting arrangement includes a clip member having a pair of spaced walls located on opposite sides of the frame side wall. A conveyor accessory is engageable with the clip member. Engagement structure is associated with the clip member and with the frame side wall adjacent the lower edge. The engagement structure provides movement of the clip member longitudinally along the frame side wall and provides engagement of the clip member with the frame side wall against exertion of a transverse pull-off force away from the frame side wall. A clamping member is engageable with the spaced walls of the clip member for drawing the clip member walls together to clamp the frame side wall therebetween. In this manner, the position of the clip member relative to the frame is selectively fixed, so as to mount an accessory in a predetermined position on the frame. The engagement structure is preferably in the form of a lower end portion of the frame being laterally offset from an upper portion of the frame, in combination with a transverse connector section extending between the upper and lower frame portions. At least one of the clip walls defines a lip which extends transversely and into engagement with the transverse connector structure defined by the frame. The clamping member is preferably in the form of a threaded member which is threadedly engaged with one of the clip member walls and which includes a head engageable with the other of the clip member walls. Advancing the threaded member functions to draw the clip member walls together so as to clamp the frame lower end portion therebetween. An accessory for mounting to a conveyor includes a mounting section having an opening through which the threaded member extends, such that the head of the threaded member is engageable with the accessory mounting structure. The threaded member is preferably located below the lower edge of the frame. The transverse connector section of the frame is in the form of an angled wall section which extends between and interconnects the lower end of the upper wall section and the upper end of the lower wall section.

The various aspects of the invention may be used separately from each other, and each serves individually to provide an enhancement to a conveyor structure. The various aspects of the invention can also be employed in combination to provide significant overall enhancements to a conveyor construction, as will be appreciated.

Various other features, objects and advantages of the invention will be made apparent from the following description taken together with the drawings.

BRIEF DESCRIPTION OF THE DRAWINGS

The drawings illustrate the best mode presently contemplated of carrying out the invention.

In the drawings:

FIG. 1 is a side elevation view of a conveyor assembly constructed according to the invention;

FIG. 2 is a top plan view of the conveyor assembly of FIG. 1;

FIG. 3 is a partial section view taken along 3—3 of FIG. 2;

FIG. 4 is a section view taken along line 4—4 of FIG. 3;

FIG. 5 is a section view taken along line 5—5 of FIG. 3;

DETAILED DESCRIPTION OF THE INVENTION

Figure 6:
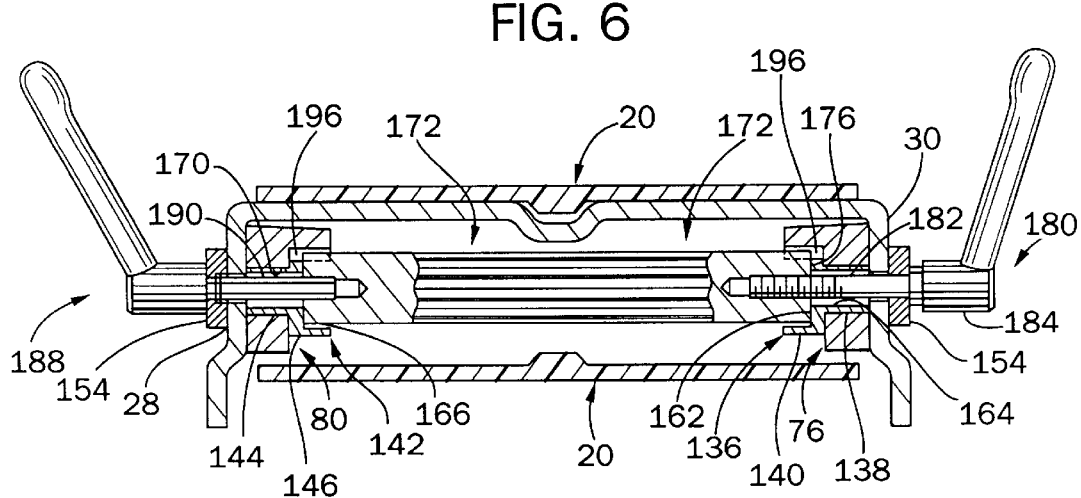
FIG. 6 is a section view taken along line 6—6 of FIG. 3.
Figure 7:
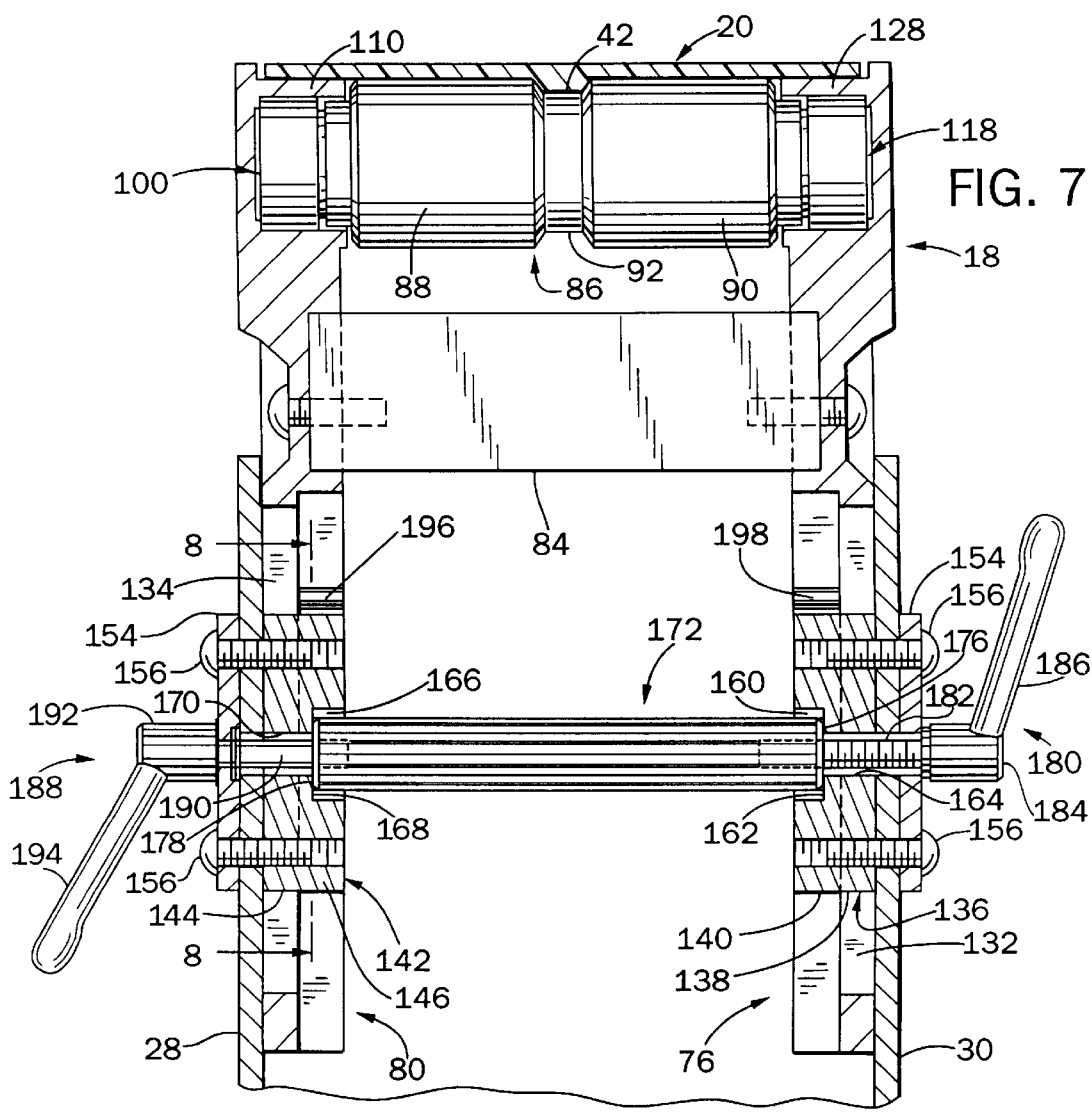
FIG. 7 is a partial bottom plan view showing the tensioning section for the conveyor assembly of FIG. 1.

Referring to FIGS. 1 and 2, a conveyor assembly 10 generally includes a frame 12, a stationary drive section 14 interconnected with a motor 16, a movable tensioning section 18, and a belt 20.

Frame 12 extends between a first end 22 located adjacent drive section 14 and a second end 24 located adjacent tensioning section 18. Referring to FIG. 4, frame 12 includes an upper wall or support surface 26 and a pair of depending side flanges or walls 28, 30 extending downwardly from the sides of upper wall 26. Side wall 28 includes an outwardly offset lower end portion 32, and side wall 30 includes an outwardly offset lower end portion 34. An angled connector section 36 extends between side wall 28 and lower end portion 32, and likewise an angled connector section 38 extends between side wall 30 and lower end portion 34. Side wall 28 and lower end portion 32 lie in parallel planes, as do side wall 30 and its associated lower end portion 34.

Frame upper wall 26 defines a central groove 40, which extends the full length of frame 12 between first end 22 and second end 24. Groove 40 is defined by a downwardly deformed central section of upper wall 26 having an upper surface which is recessed relative to the upper surface of upper wall 26 on either side of groove 40. Belt 20 includes a depending rib 42 which is received within groove 40.

Referring to FIGS. 1 and 2, drive section 14 includes a pair of side members 44, 46. Side member 44 includes a frame mounting section 48 and a spindle mounting section 50. Likewise, side member 46 includes a frame mounting section 52 and a spindle mounting section 54. A spacer 56 extends between and is mounted to side members 44, 46 such that side members 44, 46 and spacer 56 make up drive section 14. A pair of screws 58 extend through frame side wall 28 into engagement with threaded passages formed in frame mounting section 48, for securing frame mounting section 48 to frame side wall 28. Likewise, a pair of screws 60 extend through frame side wall 30 into threaded passages in frame mounting section 52, for securing frame mounting section 52 to frame side wall 30. This functions to securely mount drive section 14 to frame 12 at its first end 22.

A drive spindle 62 extends between spindle mounting sections 50, 54. Drive spindle 62 includes a pair of knurled belt engaging surfaces 64, 66, with a V-shaped groove 68 disposed therebetween for receiving belt rib 42. In a manner as will be explained with respect to tensioning section 18, spindle mounting sections 50, 54 define facing, inwardly opening cavities within which bearing assemblies are disposed, for rotatably mounting drive spindle 62 to and between spindle mounting sections 50, 54. In addition, a transverse passage is formed in spindle mounting section 54 for receiving a drive shaft 70, which is drivingly engaged with motor 16 for imparting rotation to drive spindle 62 upon operation of motor 16. A seal is disposed within the passage formed in spindle mounting section 54 and engages drive shaft 70.

Referring to FIGS. 1–3, tensioning section 18 includes a pair of side members 72, 74. Side member 72 includes a frame mounting section 76 and a spindle mounting section 78. Likewise, side member 74 includes a frame mounting section 80 and a spindle mounting section 82. A spacer 84 extends between and is mounted to side members 72, 74, such that side members 72, 74 and spacer 84 make up tensioning section 18, movably mounted to frame 12 at its first end 24, for selectively tensioning belt 20 in a manner to be explained.

An idler spindle 86 extends between and is rotatably mounted to spindle mounting sections 78, 82. Idler spindle 86 includes belt-engaging sections 88, 90 with a groove 92 therebetween for receiving belt rib 42.

FIG. 5 illustrates the arrangement by which idler spindle 86 is rotatably mounted to and between spindle mounting sections 78, 82. As shown in FIG. 5, an inwardly facing recess or cavity 94 is formed in spindle mounting section 78. Spindle mounting section 78 includes an outer end wall 96 which defines the inner end of cavity 94 and which prevents access to cavity 94 from the exterior of conveyor assembly 10. Cavity 94 defines an inwardly facing opening located adjacent the outer end of belt-engaging section 88. Spindle mounting section 78 includes a peripheral inner edge 98 which is spaced slightly outwardly from the outer end of belt engaging section 88 and which defines the inwardly facing opening of cavity 94.

Idler spindle 86 defines a stepped configuration at its end adjacent spindle mounting section 78, including a shoulder 102, a neck 103 and a cylindrical head 104. Shoulder 102 has a lesser diameter than belt engaging section 88, while neck 103 has a lesser diameter than shoulder 102 and head 104 has a lesser diameter than neck 103. A conventional sealed solid lubricant ball bearing assembly 100 is press-fit onto head 104, and is received within cavity 94 to rotatably mount idler spindle 86 to spindle mounting section 78.

Spindle mounting section 78 defines an upper wall 106, a lower wall 108 and a semicircular curved end wall 110 which extends between and interconnects upper and lower walls 106, 108, respectively. Walls 106–110 extend laterally inwardly from end wall 96, and each includes an inner surface defining the cylindrical configuration of cavity 94. Spindle mounting section 78 further includes an arcuate, semicircular end wall opposite end wall 110 and having the same configuration as end wall 110, such that cavity 94 is circular in shape. Shoulder 102 has a diameter slightly less than the insider diameter of cavity 94, so as to be spaced slightly inwardly from the inner wall of cavity 94. The end of shoulder 102 is spaced slightly from the facing end of bearing assembly 100, and neck 103 occupies the space between shoulder 102 and bearing assembly 100.

Walls 106–110 define outwardly facing surfaces adapted to support the outer portion of belt 20 extending outwardly past belt engaging section 88 of idler spindle 86. The outer surfaces of walls 106, 108 are flat and are spaced apart from each other a distance substantially equal to, or slightly less than, the diameter of belt engaging section 88. Similarly, end wall 110 has a radius substantially equal to or slightly less than the radius of belt engaging section 88, such that walls 106–110 define belt-engaging surfaces substantially in alignment with the belt-engaging surfaces of belt-engaging section 88. In this manner, belt 20 is supported throughout its entire width, with the outer portion of belt 20 being movable on the belt-engaging surfaces defined by walls 106–110.

Side member 74 is essentially a mirror image of side member 72, such that spindle mounting section 82 of side member 74 has a mirror image construction to that of spindle mounting section 78 as described. Accordingly, spindle mounting section 82 includes an inwardly opening cavity 112 and an outer end wall 114. An inner edge 116 is located adjacent the outer end of belt-engaging section 90 and spaced slightly outwardly therefrom, defining the inwardly facing opening of cavity 112. Idler spindle 86 includes a shoulder 119, a neck 120 and a head 122, defining a stepped configuration extending outwardly from the outer end of belt-engaging section 90. A conventional sealed solid lubricant ball bearing assembly 118 is press-fit onto head 122, and is received within cavity 112 for rotatably mounting idler spindle 86 to spindle mounting section 82. Heads 104, 122 are coincident with the longitudinal axis of idler spindle 86, and define an axis of rotation about which idler spindle 86 is rotatable relative to side members 72, 74.

Spindle mounting section 86 further includes an upper wall 124, a lower wall 126, an end wall 128 and an opposite end wall having the same construction and configuration as walls 106–110 as shown and described with respect to spindle mounting section 78 for supporting the outer edge portion of belt 20 outwardly of belt-engaging section 90 as described previously.

With the construction as shown and described, belt 20 overlies the spaces between spindle mounting sections 78, 82 and belt engaging sections 88, 90, respectively. In this manner, belt 20 effectively functions to provide a seal for cavities 94, 112, to prevent ingress of water or other contaminants into cavities 94, 112 which could damage bearing assemblies 100, 118. The construction of spindle mounting sections 78, 82 prevents access to the bearing-receiving cavities other than from an area enclosed by belt 20, which provides a highly effective conveyor construction for use in a wash-down environment in which conveyor assembly 10 is repeatedly exposed to water or other cleaning agents.

Further, the stepped configuration at each end of idler spindle 86 defines a labyrinth path to bearing assemblies 100, 118 to prevent bearing assemblies 100, 118 from being exposed to high pressure water when conveyor assembly 10 is cleaned with belt 20 removed. As can be appreciated, water or other cleaning liquids must traverse a path defined by the spaces between spindle mounting section inner edge 98 and the facing end surface of idler spindle belt-engaging section 88, shoulder 102 and the inner surface of cavity 94, and the outerwardly facing surface of shoulder 102 and bearing assembly 100 outwardly of neck 103, in order to reach bearing assembly 100. A similar path must be traversed at the opposite end of idler spindle 86 for liquid to reach bearing assembly 118. The spaces are oriented at right angles to each other, which functions to dissipate the pressure of washdown liquid adjacent bearing assemblies 100, 118, which are provided with conventional bearing seals to prevent ingress of liquid into the interior of each bearing assembly 100, 118. This construction provides a highly effective arrangement for enclosing bearing assemblies 100, 118 in such a manner as to ensure that water or other liquid cannot reach the interior of each bearing assembly 100, 118.

Spindle mounting sections 50, 54 of drive section side members 44, 46, respectively, are constructed similarly to spindle mounting sections 78, 82 of tensioning section side members 72, 74, respectively, as shown and described, for rotatably mounting drive spindle 62 therebetween and for supporting the outer edge portions of belt 20 outwardly of belt-engaging sections 64, 66. Similarly, with the exception of drive shaft 70, drive spindle 62 is constructed similarly to idler spindle 86, as shown and described, to prevent ingress of water into the interior of bearing assemblies engaged with drive spindle 62.

Belt tensioning section 18 is movably mounted to frame 12 as shown in FIGS. 3 and 6–8. Frame mounting sections 76, 80 include horizontal slots 132, 134, respectively. A pinion carrier or retainer block 136 is mounted to frame side wall 30, and includes an elongated outer section 138 received within slot 132, and an inner section 140. Outer section 138 is received within slot 132, such that frame mounting section 76 is longitudinally movable on retainer block outer section 138. Similarly, a pinion carrier or retainer block 142 is mounted to frame side wall 28, and includes an outer section 144 received within slot 134, and an inner section 146.

A side plate 154 is located outside each frame side wall 28, 30, and screws 156 extend through aligned openings in side plate 154 and frame side walls 28, 30, and into engagement with threaded passages formed in retainer blocks 142, 136, respectively. Screws 156 function to securely mount retainer blocks 136 and 142 to frame side walls 30, 28, respectively.

Retainer block 136 includes an arcuate, upwardly open recess 160 having an end wall 162 and a passage 164 extending through retainer block 136 and opening onto end wall 162. Openings are formed in frame side wall 30 and in side plate 154 in alignment with passage 164. Similarly, retainer block 142 includes an arcuate recess 166 having an end wall 168. A passage 170 extends through retainer block 142 and opens onto end wall 168, and openings are formed in frame side wall 28 and side plate 154 in alignment with passage 170. A drive pinion 172 extends between retainer blocks 136 and 142, and includes opposite end portions received within recesses 160, 166, respectively. Drive pinion 172 includes a series of radial teeth 174. Drive pinion 172 defines an end surface 176 located adjacent and facing end wall 162 of recess 160 formed in retainer block 136, and an end surface 178 located adjacent and facing end wall 168 of recess 166 formed in retainer block 142.

A drive pinion locking arrangement 180 is engaged with the end of drive pinion 172 adjacent retainer block 136. Locking arrangement 180 includes a threaded member 182 mounted to a head 184. A handle 186 is mounted to and extends outwardly from head 184. A threaded passage extends inwardly from end surface 176 defined by drive pinion 172, and the inner end of threaded member 182 is threadedly engaged with the threaded passage in drive pinion 172. Threaded member 182 extends through retainer block passage 164 and the aligned openings formed in frame side wall 30 and side plate 154.

A pinion actuator arrangement 188 is interconnected with drive pinion 172 opposite locking arrangement 180. Actuator arrangement 188 includes an actuator member 190 mounted to a head 192 having a handle 194 extending outwardly therefrom. Actuator member 190 extends through retainer block passage 170 and the aligned openings in frame side wall 28 and side plate 154, and is interconnected with head 192 so as to be rotatable in response to rotation of head 192. Actuator member 190 defines a non-circular cross section, and a passage having a mating cross section extends inwardly from drive pinion end surface 178 for receiving the inner end of actuator member 190.

Figure 8:
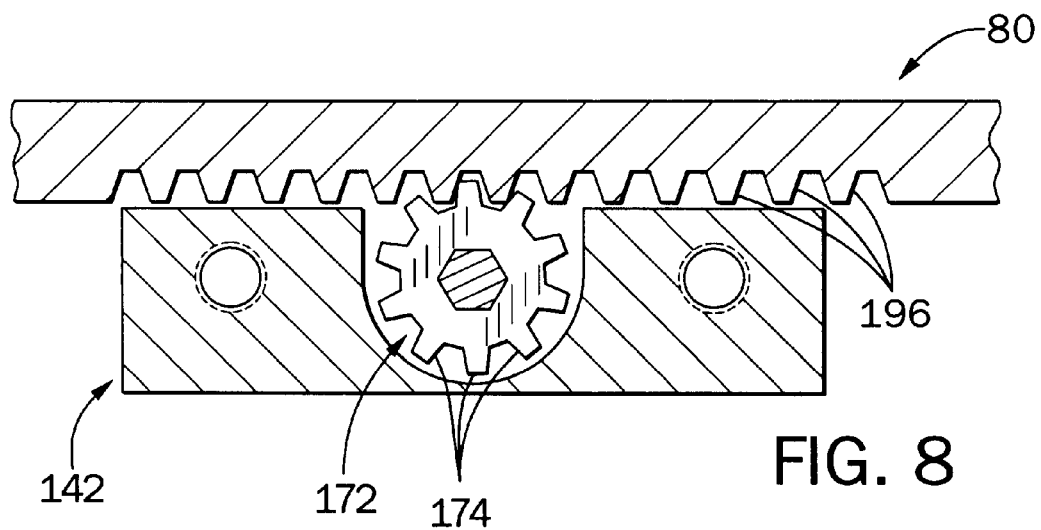
FIG. 8 is a partial section view taken along line 8—8 of FIG. 7.

Referring to FIGS. 6 and 8, frame mounting section 80 of side member 74 includes a series of gear teeth 196 forming an axially extending gear rack located vertically above and inwardly of slot 134. Frame mounting section 80 is configured such that drive pinion gear teeth 174 engage teeth 196. Similarly, frame mounting section 76 of side member 72 defines a series of downwardly facing, axially extending teeth 198 defining a gear rack located vertically above and inwardly of slot 132, and engageable with drive pinion gear teeth 174.

In operation, tensioning section 18 is selectively moved relative to frame 12 and selectively locked in position as follows. Once belt 20 is initially installed such that rib 42 is received within frame groove 40 and in initial engagement with drive spindle groove 68 and idler spindle groove 92, the user manually engages handle 194 and turns handle 194 so as to impart rotation to drive pinion actuator member 190 through head 192. This in turn causes rotation of drive pinion 172, and engagement of drive pinion gear teeth 174 with teeth 196, 198 of side members 72, 74, respectively results in lateral extension or retraction of tensioning section 18 relative to frame 12. By manipulating handle 194 so as to turn drive pinion 172 to extend tensioning section 18, the user moves tensioning section 18 to a position providing a desired degree of tension in belt 20. The user continues to exert a manual force on handle 194 to maintain the desired tension on belt 20, and simultaneously operates locking handle 186 so as to turn head 184 to advance threaded member 182 relative to drive pinion 172. This causes engagement of the inner end of head 184 with the outer surface of side plate 154, and simultaneously draws drive pinion end surface 176 toward head 184 into engagement with end wall 162 of recess 160 formed in retainer block 136. This causes frictional engagement between drive pinion end surface 176 and recess end wall 162, to lock drive pinion 172 against further rotation. The user then releases engagement of actuator handle 194 and locking handle 186. Engagement of drive pinion teeth 174 with side member teeth 196 and 198 thus locks side members 72, 74 in position relative to frame 12, to maintain tension on belt 20. When belt 20 is tensioned in this manner, it exerts an inward force on tensioning section 18, which is transferred through teeth 198 to drive pinion 172 through engagement of teeth 198 with drive pinion teeth 174. This exerts a rotational force on drive pinion 172, and the threads of threaded member 182 are pitched so as to tighten engagement of drive pinion end surface 176 against recess end wall 162. This results in a self-tightening action on drive pinion 172 under the influence of belt 20, to ensure that tensioning section 18 is maintained in a desired position during operation.

It can thus be appreciated that locking arrangement 180 provides a single-point locking mechanism for maintaining tensioning section 18 in a desired position. This eliminates the need for an external tool and manipulation of multiple screws to lock the tensioning section in position, thus providing a simple, quick and efficient tensioning mechanism. This construction also eliminates the need for a cam-type mechanism for adjusting one side of the tensioning section relative to the other to prevent skewing of belt 20. With the arrangement as shown and described, engagement of drive pinion 172 with the integrally formed teeth on side members 72, 74 ensures that side members 72, 74 are simultaneously and synchronously extended relative to frame 12. If belt 20 is subject to any skewing tendency, engagement of belt rib 42 with frame groove 40 throughout the upper run of belt 20, and with groove 68 and 92 in drive and idler spindles 62, 86, respectively, prevents any such skewing and maintains positive tracking of belt 20.

Figure 9:
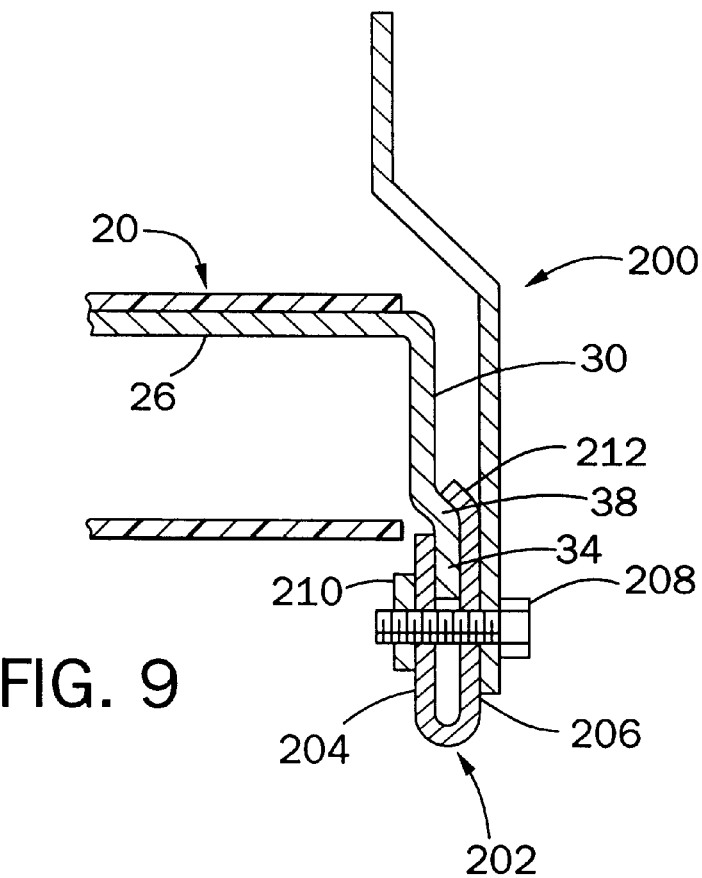
FIG. 9 is a partial section view showing a clip for mounting a conveyor accessory to the conveyor assembly of FIG. 1.

FIG. 9 illustrates an arrangement for mounting a conveyor accessory, such as a side plate 200, to conveyor frame 12. In this arrangement, a clip member 202 is engaged with lower end 34 of frame side wall 30. Clip member 202 is generally U-shaped, and includes parallel inner and outer walls 204, 206, respectively. Aligned openings are formed in walls 204, 206, and a screw 208 having a threaded shank extends through the aligned openings in walls 204, 206 and into threaded engagement with a nut 210 mounted to inner wall 204 and having a threaded opening in alignment with the aligned openings in walls 204, 206. The shank of screw 208 is disposed below the lower end of side wall lower portion 34. Side plate 200 includes a mounting section having an opening positioned so as to be in alignment with the aligned openings in side walls 204, 206, such that the shank of screw 208 extends therethrough and the head of screw 208 engages an outwardly facing surface defined by the mounting section of side plate 200.

The upper end of clip member outer wall 206 includes an inwardly bent lip 212. Lip 212 overlies angled connector section 38 which extends between side wall lower end 34 and the portion of side wall 30 thereabove. With this construction, clip member 202 can be slid longitudinally along side wall 30 while maintaining engagement therewith by engagement of lip 212 with connector section 38 and to prevent disengagement of clip member 202 against exertion of a pull-off force away from and parallel to side wall 30 and its lower end 34. When clip 202 is moved to a desired position on frame 12, the user tightens screw 208 so as to draw inner and outer walls 204, 206, respectively, together to clamp side wall lower end 34 therebetween. This frictional engagement of side wall lower end 34 prevents clip member 202 from movement relative to frame 12, so as to securely mount side plate 200 to frame 12. Preferably, a number of clip members such as 202 are used to support side plate 200 at spaced locations along its length. Clip member 202 can be engaged with either side wall of conveyor frame 12, and can easily be removed when not in use. This construction enables frame 12 to be cold-formed, so as to facilitate its manufacture of a material such as stainless steel or the like for use in a wash-down application. This construction also avoids forming the conveyor frame of an extruded section providing a groove or slot arrangement for receiving T-nuts or the like in order to mount accessories to a conveyor frame.

While the accessory mounting arrangement of FIG. 9 is shown in connection with mounting of a side plate 200, it is understood that any other accessory or device may be mounted to conveyor assembly 10 in this manner.

Various alternatives and embodiments are contemplated as being within the scope of the following claims particularly pointing out and distinctly claiming the subject matter regarded as the invention.

We claim:

1. A spindle mounting arrangement for a conveyor construction including a belt and a spindle about which the belt is trained, comprising a spindle mounting member including end wall structure and laterally extending wall structure which cooperate to define an inwardly open cavity, and a bearing arrangement disposed within the cavity for rotatably mounting the spindle to the spindle mounting member, wherein the laterally extending wall structure defines an outwardly facing belt engagement surface and defines an opening to the cavity which faces the spindle, and wherein the end wall structure and the laterally extending wall structure of the mounting member are configured so as to enclose the cavity from the exterior of the mounting member, wherein the belt engages the spindle and the belt engagement surface defined by the laterally extending wall structure to prevent access to the cavity from the opening to the cavity defined by the laterally extending wall structure.

2. The spindle mounting arrangement of claim 1, wherein the spindle includes an outer surface for engagement with the belt, and wherein the belt engagement surface defined by the laterally extending wall structure terminates in an inner edge at least in part defining the opening and located adjacent the outer surface of the spindle, wherein the belt is in engagement with the outer surface of the spindle and overlies the inner edge of the belt engagement surface.

3. The spindle mounting arrangement of claim 2, wherein the cavity is formed in an outer end portion of the spindle mounting member and wherein the spindle mounting member is mounted to a frame associated with the conveyor construction, and wherein the cavity is formed so as to define a peripheral inner edge defining the inwardly facing opening, wherein the peripheral inner edge is spaced from an outer surface defined by the spindle, and wherein the belt extends outwardly of the peripheral inner edge into engagement with the belt engagement surface of the laterally extending wall structure of the spindle mounting member, and engages the outer surface of the spindle and the belt-engaging surface.

4. The spindle mounting arrangement of claim 2, wherein the spindle includes a belt-engaging portion and a shaft extending outwardly therefrom defining an axis of rotation about which the spindle is rotatable, wherein the spindle shaft extends into the cavity and is engaged with the bearing arrangement within the cavity.

5. The spindle mounting arrangement of claim 2, wherein the spindle further includes a shoulder section extending laterally outwardly of the outer surface of the spindle with which the belt is engaged, wherein the shoulder section extends into the inwardly open cavity of the spindle mounting member.

6. The spindle mounting arrangement of claim 2, wherein a space is defined between an inner edge of the belt engagement surface and an end defined by the outer surface of the spindle, wherein the belt overlies the space.

7. The spindle mounting arrangement of claim 6, wherein the spindle and the spindle mounting member cooperate to define a labyrinth path between the space and the bearing arrangement for dissipating energy in washdown liquid at the bearing arrangement when the belt is removed.

8. A conveyor construction, comprising:

a belt;

at least one spindle defining an outer engagement surface for engaging the belt; and at least one spindle mounting member for rotatably mounting the spindle, wherein the spindle mounting member includes a rotatable mounting arrangement with which the spindle is engaged for rotatably mounting the spindle to the spindle mounting member, wherein the spindle mounting member includes laterally extending wall structure defining an outwardly facing belt-engaging surface, wherein a gap is defined between the outer engagement surface of the spindle and the outwardly facing belt-engaging surface of the spindle mounting member;

wherein the belt overlies the outer engagement surface of the spindle and at least a portion of the outwardly facing belt-engaging surface of the spindle mounting member adjacent the gap so as to cover the gap.

9. The conveyor construction of claim 8, wherein the laterally extending wall structure of the spindle mounting member defines an inwardly opening cavity enclosed by the belt and within which the rotatable mounting arrangement is disposed.

10. The conveyor construction of claim 9, wherein the spindle mounting member includes an end wall and wherein the laterally extending wall structure extends inwardly from the end wall to define the inwardly open cavity, wherein the end wall encloses the cavity to prevent access thereto from the exterior of the spindle mounting member.

11. The conveyor construction of claim 9, wherein the rotatable mounting arrangement comprises a bearing assembly disposed within the cavity, wherein the spindle includes an outwardly extending shaft engaged with the bearing assembly and defining the axis of rotation of the spindle.

12. The conveyor construction of claim 9, wherein the laterally extending wall structure of the spindle mounting member defines an inwardly facing peripheral edge forming an inwardly facing opening through which the cavity is accessible, wherein the peripheral edge is spaced from the outer engagement surface of the spindle to define the gap therebetween.

13. The conveyor construction of claim 9, wherein the spindle includes a shoulder section extending laterally outwardly from the outer engagement surface of the spindle, wherein the shoulder section extends into the inwardly opening cavity defined by the laterally extending wall structure of the spindle mounting member.

* * * * *